United States Patent
Ramesh et al.

(10) Patent No.: US 10,114,964 B2
(45) Date of Patent: Oct. 30, 2018

(54) ROLE-BASED CONTENT RENDERING

(71) Applicant: TATA CONSULTANCY SERVICES LIMITED, Maharashtra (IN)

(72) Inventors: Rajini Ramesh, Karapakkam (IN); Madhavi Garlapati, Karapakkam (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 13/762,920

(22) Filed: Feb. 8, 2013

(65) Prior Publication Data
US 2013/0212703 A1    Aug. 15, 2013

(30) Foreign Application Priority Data
Feb. 10, 2012 (IN) ............................ 377/MUM/2012

(51) Int. Cl.
| | |
|---|---|
| *G06F 7/04* | (2006.01) |
| *G06F 21/62* | (2013.01) |
| *G06Q 10/06* | (2012.01) |
| *G06F 17/30* | (2006.01) |

(52) U.S. Cl.
CPC ......... *G06F 21/6218* (2013.01); *G06Q 10/06* (2013.01); *G06Q 10/06393* (2013.01)

(58) Field of Classification Search
CPC .................................................. G06F 21/604
USPC ............................................................. 726/28
See application file for complete search history.

(56) References Cited

U.S. PATENT DOCUMENTS

| | | | | |
|---|---|---|---|---|
| 7,926,030 | B1* | 4/2011 | Harmon | G06F 9/44505 717/121 |
| 7,954,064 | B2 | 5/2011 | Forstall et al. | |
| 8,601,263 | B1* | 12/2013 | Shankar | H04L 63/0428 713/166 |
| 2004/0224674 | A1* | 11/2004 | O'Farrell | G06F 17/30575 455/418 |
| 2005/0149206 | A1* | 7/2005 | Krane | G06F 9/451 700/17 |
| 2005/0198324 | A1* | 9/2005 | Silva | G06F 21/62 709/229 |
| 2005/0262549 | A1* | 11/2005 | Ritt | G06F 21/33 726/1 |

(Continued)

OTHER PUBLICATIONS

The Exponential Rise of the Dashboard.
Real-time, interactive dashboard reporting.

*Primary Examiner* — Gary S Gracia
(74) *Attorney, Agent, or Firm* — Lee & Hayes, PLLC

(57) ABSTRACT

Systems and methods for rendering role-based content are described herein. The system includes a registration module configured to define an application role in a metadata driven framework for providing selective access to the content. The content may include data and content objects. The registration module may also be configured to associate content objects with the application role. The system may also include an authentication module configured to authenticate a user from a plurality of users. The user may be authenticated based on log-in credentials of the user. The authentication module may also determine the application role of the user. Additionally, the authentication module may identify one or more content objects based on the determined application role of the user. The content objects may be identified based on the application role of the user.

15 Claims, 8 Drawing Sheets

(56) References Cited

U.S. PATENT DOCUMENTS

| | | | |
|---|---|---|---|
| 2006/0026213 A1* | 2/2006 | Yaskin | G09B 7/02 |
| 2007/0056026 A1* | 3/2007 | Britton | G06F 21/6236 726/5 |
| 2007/0079369 A1* | 4/2007 | Grinstein | G06F 21/31 726/19 |
| 2007/0088707 A1* | 4/2007 | Durgin | G06F 17/30581 |
| 2007/0180491 A1* | 8/2007 | Mevissen | H04L 63/10 726/2 |
| 2007/0266037 A1* | 11/2007 | Terry | G06F 3/0607 |
| 2008/0010233 A1* | 1/2008 | Sack | G06F 21/6227 |
| 2008/0027924 A1* | 1/2008 | Hamilton | G06F 17/30867 |
| 2008/0127032 A1* | 5/2008 | Mital | G06F 8/10 717/100 |
| 2008/0154691 A1* | 6/2008 | Wellman | G05D 1/0282 705/7.26 |
| 2008/0250071 A1* | 10/2008 | Norring | G06F 8/38 |
| 2008/0263462 A1* | 10/2008 | Mayer-Ullmann | G06F 9/451 715/762 |
| 2008/0276218 A1* | 11/2008 | Taylor | G06F 8/38 717/106 |
| 2009/0049047 A1* | 2/2009 | Battepati | G06F 21/6218 |
| 2009/0064017 A1 | 3/2009 | Biniak et al. | |
| 2009/0235167 A1* | 9/2009 | Boyer | G06F 17/30864 715/708 |
| 2009/0300151 A1* | 12/2009 | Friedman | G06F 11/3664 709/222 |
| 2010/0191554 A1* | 7/2010 | Singh | G06Q 10/063 705/7.11 |
| 2010/0235635 A1* | 9/2010 | Kshirsagar | H04L 63/0428 713/168 |
| 2011/0022642 A1* | 1/2011 | deMilo | G06F 17/30082 707/805 |
| 2011/0047611 A1* | 2/2011 | Hayler | G06F 12/1466 726/12 |
| 2011/0119449 A1* | 5/2011 | Neerincx | G06F 12/0802 711/133 |
| 2011/0246527 A1* | 10/2011 | Bitting | G06F 21/604 707/784 |
| 2011/0258233 A1* | 10/2011 | Unger | G06F 17/30457 707/783 |
| 2011/0277017 A1* | 11/2011 | Ivanov | G06F 21/6218 726/4 |
| 2011/0289161 A1* | 11/2011 | Rankin, Jr. | G06Q 10/107 709/206 |
| 2011/0296001 A1* | 12/2011 | Ramstrom | G06F 21/31 709/224 |
| 2011/0320819 A1* | 12/2011 | Weber | H04L 9/3215 713/176 |
| 2012/0015342 A1* | 1/2012 | Baldwin | G06F 17/279 434/365 |
| 2012/0137213 A1* | 5/2012 | Hayler | G06F 12/1466 715/239 |
| 2012/0173996 A1* | 7/2012 | Bartomeli | G06F 9/451 715/762 |
| 2013/0006887 A1* | 1/2013 | Balko | G06Q 10/00 705/348 |
| 2013/0139096 A1* | 5/2013 | Rist | G06F 9/451 715/781 |
| 2013/0159037 A1* | 6/2013 | Keil | G06Q 10/06 705/7.12 |
| 2013/0159199 A1* | 6/2013 | Keil | G06Q 10/06 705/304 |
| 2013/0166678 A1* | 6/2013 | Barak | H04L 67/303 709/217 |
| 2013/0312094 A1* | 11/2013 | Zecheru | G06F 21/577 726/23 |
| 2014/0244765 A1* | 8/2014 | Smith | H04L 51/24 709/206 |

* cited by examiner

ROLE-BASED CONTENT RENDERING

TECHNICAL FIELD

The present subject matter relates, in general, to content rendering, and in particular, to rendering role-based content in a metadata driven framework.

BACKGROUND

Generally, decisions related to a business are made based on information provided by reporting tools. The reporting tools generate human-readable reports from various data sources of an organization. Further, the reporting tools provide user interfaces or display screens containing information that may be helpful in day-to-day decision making. Typically, the user interfaces are associated with a specific application, and thus, the user interfaces organize and provide information related to the particular application in a way that is easy to read and interpret. The user interfaces can include taskbars, menus, virtual buttons, and pictorial representations, such as graphs and charts. In business scenarios, the reporting tools provide users an at-a-glance perspective of a business. For example, reports generated by the reporting tools help the users to consolidate key performance indicators (KPIs) to monitor critical issues and assist in identifying areas that need immediate attention.

Generally, the conventional reporting tools extract information from a single source, such as a database storing various types of information related to an organization. The conventional reporting tools may further facilitate users in selecting information as per their requirement. For example, the conventional reporting tools may allow users to submit queries for viewing the information they want to view. The users may need to form queries every time they would like to view specific information.

SUMMARY

This summary is provided to introduce concepts related to role-based content rendering systems, which are further described below in the detailed description. This summary is neither intended to identify essential features of the claimed subject matter nor is it intended for use in determining or limiting the scope of the claimed subject matter.

In one embodiment, the present subject matter discloses systems and methods for rendering role-based content. In an implementation, the system may include a registration module and an authentication module. The registration module may be configured to define one or more application roles in a metadata driven framework for providing selective access to the content. In said implementation, the content may include data and content objects. The one or more application roles may be assigned to a plurality of users associated with the metadata driven framework. Further, the registration module may be configured to associate the content objects with the one or more application roles. The content objects may be determined based on metadata associated with the user. Furthermore, the authentication module may be configured to authenticate the user. The user may be authenticated based on login credentials of the user. The authentication module may also determine the application role of the user. The application role may be configured to identify one or more of the content objects that may be accessible to the user. In addition, the authentication module may be configured to provide access of the content to the user based on the application role associated with the user.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

FIGS. 2a-2g illustrates exemplary UIs for an incident management system, in accordance with an embodiment of the present subject matter.

DETAILED DESCRIPTION

Figure 1:
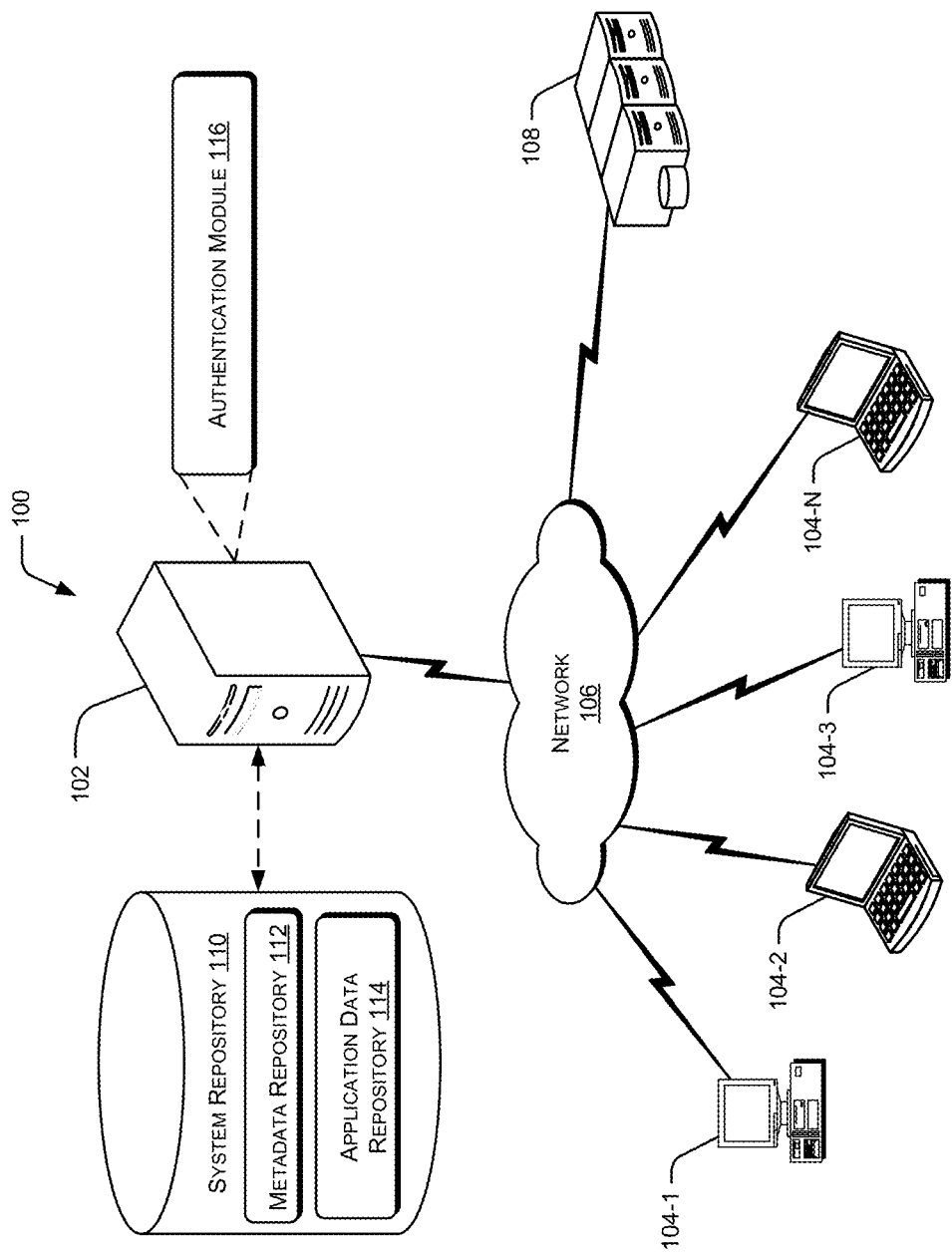
FIG. 1 illustrates a network environment implementing a role-based content rendering system, in accordance with an embodiment of the present subject matter.

To cater to dynamic business situations, users require data in real-time for making business related decisions. Typically, a reporting tool enables a user in making business related decisions by providing information related to an organization. Generally, the reporting tool may extract the information from a single source, such as a database storing various types of information related to the organization. The reporting tool may further facilitate users in selecting information as per their requirement. To do so, a user may submit a query related to the information they want to view to the reporting tool. For example, a user may want to see performance related data of a sales team of the organization. The user may accordingly submit a query and may get information pertaining to a particular team, for example, a sales team by the reporting tool. However, to select required information the user may need to form a query by writing a code, which may be inconvenient and time consuming for the user as every time the user needs to view specific information, the user have to form a query.

In addition, the conventional reporting tool may allow all users to access all the information related to the organization. This may enable unauthorized users to access the content which may not be otherwise available for access. For example, any user in an organization may have access to all the information related to various departments, all team members, and so on.

Further, most of present day reporting tools, such as dashboards, may provide user interface (UI) elements displayed on a display unit, such as a screen. The UI elements include information and one or more tools (e.g., applications) that may enable the user to perform common tasks and promptly access information. The UI elements can perform a variety of tasks, including without limitation, communicating with a remote server to provide information to the user (e.g., weather report), providing commonly needed functionality (e.g., a calculator), or acting as an information repository. These UI elements can be displayed and accessed through the reporting tool on a display screen. Although the UI elements may be useful for the user, they may result in a cluttered screen. In other words, due to large number of UI elements available to a user, the screen associated with the reporting tool may become disorganized, thereby making it difficult for the user to quickly locate and access a selected UI element.

At times, a user may only need to access a few of the UI elements from all the UI elements available on the screen for a given task. Conventional reporting tools may be incapable of allowing a user to select only those elements that the user wants to view. Therefore, identifying a few UI elements amongst various UI elements may be a time consuming task for the user. Additionally, the conventional reporting tools may not be capable of providing customized information based on metadata. Further, the conventional reporting tools find it difficult to provide reports based on structured metadata as the conventional reporting tools may be slow due to dynamic query formation in the metadata.

Moreover, the conventional reporting tools may provide static information. The static information may refer to the content that has been configured with the reporting tools by a user, such as an administrator. For example, the conventional reporting tools display content, such as summaries and graphs, for highlighting important information about an organization. However, these summaries and graphs are based on the information stored by the administrator. As the information may not be updated on a regular basis by the administrator, the conventional reporting tools may be incapable of providing real-time information. Further, these reporting tools are usually configured to cater to a single application and may not allow the users to access data of an application other than the one that the reporting tools are providing the information for.

The present subject matter discloses aspects related to rendering role-based content to a plurality of users in a metadata driven framework (hereinafter referred as framework). In an implementation, the present subject matter may include a system that may facilitate access of content, such as data and content objects to the plurality of users. In an implementation, the system may employ metadata for defining various content objects provided for various applications supported by the system. The applications may include, but are not limited to, a payroll application, an enterprise resource planning (ERP), a customer relationship management (CRM), and a human resource management (HRM) application. The system may provide the plurality of UIs for the various applications to render role-based content. Further, each of the plurality of UIs may include at least one UI element, such as a widget.

In an aspect, the data may refer to enterprise data associated with at least one application supported by the metadata driven framework. The data may be accessible to the plurality of users. Further, the content objects may include a plurality of UIs and UI elements. In an implementation, the system may facilitate in defining application roles for each user accessing the data rendered by the system. The application roles may enable each user amongst the plurality of users to selectively access contents in the framework. The application roles may define access permissions that each user may have to access information recorded in the system. Further, all permissible actions of the user may be authorized based on the application roles associated with that user.

In an enterprise environment, users may be segregated in different application roles, such as managers, executives, and employees. The application roles can then be associated with the applications hosted by the system. Further, all applications of the system may not be accessible to all application roles. In an implementation, the access to the applications can also be based on the application roles associated with the users.

Further, in an implementation, to allow selective access to the various users, each of the application roles assigned to the plurality of users may be associated with the content objects of the system. As mentioned above, the content objects may include the plurality of UIs, such as web pages, and a plurality of UI elements, such as widgets provided in each of the plurality of UIs. In an embodiment, each UI of the plurality of UIs may define a workspace for a user. In an implementation, the application roles assigned to each of the plurality of users may decide which of the plurality of UIs may be accessible to the each of the plurality of users. For example, a user having assigned a manager's role may be provided access to all applications of the system and all UIs associated with the applications. However, a user having an employee role may only be provided a few UIs of the applications.

In an implementation, the present subject matter may also facilitate in defining one or more UI elements associated with the users and the application roles, based on the access permissible to the user. A UI element may be defined as a stand-alone application that may be embedded into the UI and can be accessed by the user, depending on the authorization. Hence, in an implementation, the UI elements may be provided on the plurality of UIs of the framework. In an embodiment, the UIs may also include objects, such as tabular data, images, graphs, reports, and charts, other than the UI elements. In said implementation, all the UIs may include some of the UI elements by default, such as UI elements that can be accessed by all the users working in the organization, from managers to team members. Each of the users, based on their application roles, may be authorized to add more UI elements to their workspaces formed by one or more UIs. For example, the users may be allowed to select position of each of the UI elements on the UI; the position may include overlapping the UI elements, minimizing and maximizing the UI elements, and the like. Thereafter, the identified UIs having the UI elements in the positions as selected by the user may be provided access to the user. Hence, in one implementation, the user may define a layout of the UI in which the plurality of UI elements may be provided.

Further, each application role may be associated with a plurality of rules. The plurality of rules may be configured to secure the content objects of the framework from unauthorized access. Accordingly, the plurality of rules may restrict the access to UI elements by the users. In an embodiment, the plurality of rules may be configured to define and control data access by users based on their pre-defined application roles. In an example, referring to the enterprise environment, the plurality of rules associated with the UI elements may allow the manager to modify any of the plurality of UI elements, whereas, may not allow the employee to modify the UI elements accessible to the employee. In another example, based on the rules associated with the different application roles, the manager may be provided complete access of all the enterprise data and also to the content objects, i.e. UIs and UI elements associated with the other application roles. The enterprise data may refer to the data related to an enterprise that may be rendered on the UIs. Considering the same example, the executives may have access of the entire enterprise data related, and the employees may have access to the enterprise data of their respective departments in the enterprise.

In an implementation, the framework may be configured to provide and render the content objects, along with the data associated with various applications, based on the application role associated with the user. Before the content objects are rendered and provided to the user, the present subject matter may facilitate authentication of the user and the content objects can be made available to the user after identity of the user and access has been authenticated. In an example, the identity and access of the user may be authenticated based on login credentials of the user. Once the user has been authenticated, the application role assigned to the user may be determined and based on the application role of the user and the rules associated therewith, the user may be provided access to the content objects. As mentioned herein, the access to the content objects may include providing access to one or more UIs and UI elements associated with the application role of the user.

As described above, the system of the present subject matter may render the content objects based on the metadata. In an implementation, the metadata may be stored in a repository and may include relational data regarding various applications hosted by the system. The metadata driven framework of the system may support rendering of the data in different formats. For example, the system may provide the data as one line status, may allow drill-down within the same UI for getting more detailed information, and may also allow drill-down into a new page. The system may also include an application repository having the data about various applications supported by the system. When a user submits a query, the metadata repository may provide details of the data and may direct the query to the application repository from where the actual data associated with the application role of the user may be rendered.

According to an aspect, upon the rendering of the content, the user may choose to modify the content objects through which the data is rendered. For example, the user may choose to change and redefine the layout of the UI. Accordingly, in an implementation, the system can allow the user to configure a custom logic, for example, by providing inputs on a screen. It will be understood that such privileges can be provided to users that are associated with a certain application role. For example, such capability to define custom logic can be provided to a privileged user, such as a manager, who may create the layout of the UI and select the UI elements as per choice.

These and other advantages of the present subject matter would be described in greater detail in conjunction with the following figures. While aspects of described systems and methods for rendering role-based content can be implemented in any number of different computing systems, environments, and/or configurations, the embodiments are described in the context of the following exemplary system(s).

FIG. 1 illustrates a network environment 100 implementing a role-based content rendering system 102, (hereinafter referred as system 102), in accordance with an embodiment of the present subject matter. In said embodiment, the network environment 100 includes the system 102 configured to provide role-based content to a user. In one implementation, the network environment 100 may be a company network, including thousands of office personal computers, laptops, various servers, such as blade servers, and other computing devices. Examples of a company may include an information technology (IT) company, a product manufacturing company, a human resource (HR) company, a telecommunication company, or other large conglomerates. It will also be appreciated by a person skilled in the art that the company may be any company involved in any line of business.

The system 102 may be implemented in a variety of computing systems, such as a laptop computer, a desktop computer, a notebook, a workstation, a mainframe computer, a server, a network server, and the like. In one implementation, the system 102 may be included within an existing information technology infrastructure or a database management structure. Further, it will be understood that the system 102 may be connected to a plurality of user devices 104-1, 104-2, 104-3, . . . , 104-N, collectively referred to as the user devices 104 and individually referred to as a user device 104. The user device 104 may include, but is not limited to, a desktop computer, a portable computer, a mobile phone, a handheld device, and a workstation. The user devices 104 may be used by users, such as database analysts, programmers, developers, data architects, software architects, module leaders, projects leaders, database administrator (DBA), stakeholders, and the like.

As shown in the figure, the user devices 104 are communicatively coupled to the system 102 over a network 106 through one or more communication links for facilitating one or more end users to access and operate the system 102. In one implementation, the network environment 100 may be a home network with a limited number of personal computers and laptops connected over the network 106. Further, the network 106 may be a wireless network, a wired network, or a combination thereof. The network 106 may also be an individual network or a collection of many such individual networks, interconnected with each other and functioning as a single large network, e.g., the Internet or an intranet. The network 106 may be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 106 may include a variety of network devices, including routers, bridges, servers, computing devices, storage devices, and the like.

In an implementation, the system 102 may be connected to an enterprise system 108 over the network 106 through one or more communication links. The communication links between the system 102 and the enterprise system 108 may be enabled through a desired form of communication, for example, via dial-up modem connections, cable links, digital subscriber lines (DSL), wireless or satellite links, or any other suitable form of communication. Further, the system 102 may be configured to retrieve data from the enterprise system 108. In an example, the enterprise system 108 may be implemented at a business enterprise or a financial institution, such as a bank or a stock exchange. Examples of such enterprise system 108 may include, but are not limited to, enterprise resource planning (ERP) systems, customer relationship management (CRM) systems, and supply chain management (SCM) systems.

In an implementation, the system 102 may be coupled to a system repository 110. In an implementation, the system repository 110 may include a metadata repository 112 and an application data repository 114. It will be understood that although the system repository 110 is shown external to the system 102, the system repository 110 may also be provided internal to the system 102. In an implementation, the system repository 110 may be provided as a relational database and may store data in various formats, such as relational tables, object oriented relational tables, indexed tables. Further, it will be understood that the system repository 110 may be provided as one or more operational databases.

In an implementation, the metadata repository 112 may include metadata that may define data of various users associated with the framework and may enable management of database design, such as new table definition, attribute types, resource definitions, security polices, trigger definitions and relationships between the tables of enterprise data. Accordingly, the metadata repository 112 may provide consistent and reliable means of accessing data. Further, the application data repository 114 may include data, such as data about various applications being supported by the framework of the system 102.

In an implementation, the system 102 may facilitate in establishing and storing credentials of various users at a registration or setup stage. At said stage, the user may be required to provide personal information, such as name and date of birth, to the system 102, based on the personal information the user may be provided credentials by the system 102. In an implementation, the application data repository 114 may also include data about various users that may be registered with the system 102. Further, the application data repository 114 may include authentication details of a user for accessing the enterprise data.

The application data repository 114 may receive metadata from enterprise systems, such as the enterprise system 108. In an implementation, the metadata repository 112 may be configured to store relations between various applications, their associated data and associated users. Further, the metadata repository 112 may be configured to receive a query from the user device 104. In present implementation, the query may be generated automatically when the user logs in the system 102 by providing the credential information. Based on the query, the metadata repository 112 may identify the location, in the application data repository 114, of the data that the user device 104 may be seeking. Further, based upon the location, application data repository 114 may facilitate rendering the data associated with the query and may provide it to the requesting user device 104.

The present subject matter may facilitate definition of one or more application roles for a plurality of users of the system 102. Further, the system 102 may facilitate defining rules for each of the application roles. In an implementation, the rules may be configured to define the applications that may be accessible to each of the application role. The rules may also be configured to provide permissions to the users for accessing the data, related to the applications that may be stored in the application data repository 114. Once the rules are defined, the application role of each of the users may be associated with the content objects of the framework of the system 102. In an embodiment, the content objects may include UIs and UI elements provided on the UIs. The system 102 may also facilitate the users to execute a custom logic for rendering data on the UIs. In an implementation, one or more application roles may be associated with the user at the registration or setup stage. The association of users, application roles, and content objects may be stored in the metadata repository 112.

In an example, the application roles may be understood as various access roles assigned to users of an application. In case of an organization, the application roles may include a manager and an employee. The application may refer to various applications that may be hosted by the system 102. Further, the data may refer to the information that may be accessible to the users according to their application roles. In an example, the UIs may be understood as pages of an application for rendering data to the users. In said example, UI elements may be referred as widgets, such as reports, charts, and graphs, that may be accessible to the users through the UIs based on their application roles.

In an embodiment, the framework of the present subject matter may define a model in which the UIs and the UI elements may share a dependency relationship with each other. For example, multiple UIs may be associated with multiple application roles. In an alternative embodiment, one UI may be associated with multiple application roles. Further, each UI may be mapped with one or more UI elements, such as widgets. In an implementation, the UI may or may not have filters associated with them. In a scenario of said implementation, if the UI is associated with a filter, the filter may be based on a parameter. Based on the aforementioned dependency relationships data is created and shared amongst the plurality of users of the system 102.

As mentioned earlier, the system 102 may facilitate generation of the plurality of UIs for the plurality of users. In an implementation, the system 102 may access the metadata repository 112 for defining the plurality of UI elements, such as widgets for the plurality of UIs provided by the framework. The system 102 may further enable the plurality of UI elements to interact with an end-user. In an implementation, the framework of the system 102 may be implemented on various platforms and/or networks (e.g., client/server networks, stand-alone computers, portable electronic devices, mobile phones, etc.), and/or embedded or bundled with one or more software applications (e.g., email, media player, browser, etc.).

In said implementation, the plurality of UI elements may be displayed and accessed through the plurality of UIs. The framework of the system 102 may facilitate the user to interact with the plurality of UI elements. In an embodiment, the plurality of UI elements may be associated with the applications supported by the framework. In an implementation, the applications supported by the framework may include a payroll application, an enterprise resource planning (ERP), a customer relationship management (CRM), a human resource management (HRM) application, and the like. Further, the user may be capable of customizing the plurality of UI elements as per choice. For example, the user may move UI elements around the UI, select location of the UI elements on the UI, resize the plurality of UI elements, and the like.

Once the application roles are defined, user profiles associated, and rules are configured to define the access to each user, according to an aspect, the user may access the enterprise system 108 through the system 102 to access the enterprise data. In an implementation, before the user is allowed access to the enterprise data, the system 102 can authenticate an access to the user. For the purpose of authenticating access, in an embodiment, the system 102 may include amongst other modules an authentication module 116. The authentication module 116 may be configured to authenticate the access to the user based on login credentials (e.g., username and password) provided by the user. Based on those credentials, the system 102 may allow the user to access content objects of the system 102. Further, when the user attempts to access the system 102, the authentication module 116 may compare the credentials of the user with pre-stored credentials. Upon authentication, if the user is identified as an authenticated user, the system 102 may communicate with the system repository 110 to determine the application role associated with the authenticated user. Based on the application role of the user, the system 102 may allow the user to access one or more applications provided by the framework of the system 102.

In one embodiment, once the application role of the authenticated user is determined, the system 102 may communicate with the application data repository 114 to identify the content objects accessible to the authenticated user. The content objects may include the applications, the UIs, and the UI elements that may be accessible by the authenticated user for accessing the enterprise data in the business enterprise system 108. In an implementation, the UIs may represent a workspace for the authenticated users and may be personalized as per their requirements.

The system 102 may also be configured to determine which of the UI elements from the plurality of UI elements may be accessible to the authenticated user. In an example, the UI elements that may be accessible to the authenticated user are determined by identifying the content objects that are accessible to the authenticated user, based on the application role. Accordingly, the system 102 as disclosed by the present subject matter may provide role-based content objects to a user. In one implementation, the system 102 may enable association of multiple UIs with the user based upon the application role assigned to the user. This may provide restricted and controlled access of the content objects to the user.

The system 102 of the present subject matter may facilitate providing information to the plurality of users from different sources, such as from an operating system (OS) in a computer, from one or more applications running on the computer, and from one or more remote sites on the Web, and present the information in a consolidated manner. The plurality of users may interact with the system 102 and obtain information in real-time. The use of metadata at real-time may provide more flexibility to the system 102.

Figure 2:
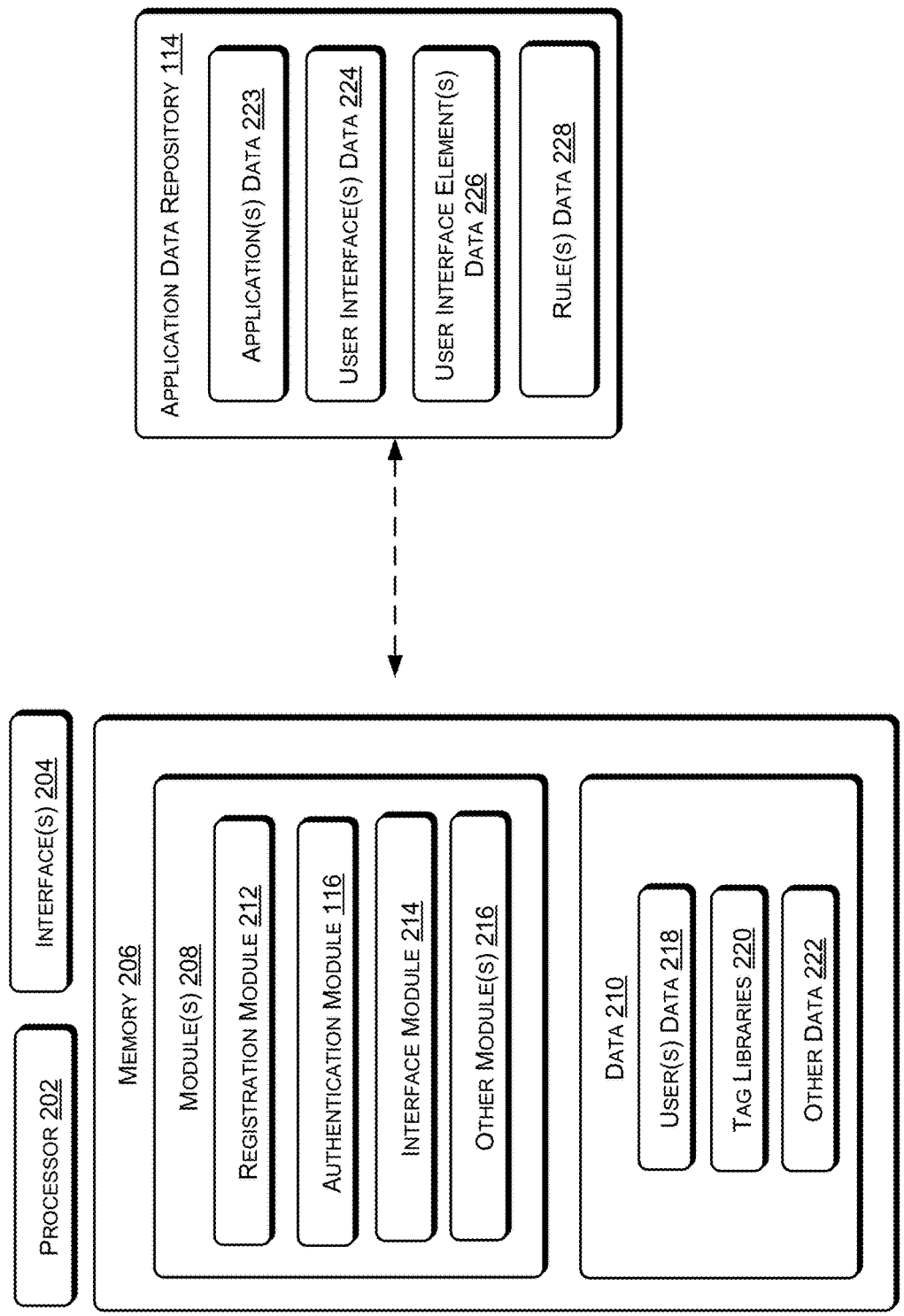
FIG. 2 illustrates components of the role-based content rendering system, in accordance with an embodiment of the present subject matter.

FIG. 2 illustrates components of the system 102, in accordance with an embodiment of the present subject matter. In one embodiment, the system 102 includes a processor 202, an interface(s) 204, and a memory 206 coupled to the processor 202. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions stored in the memory 206.

The interface(s) 204 may include a variety of software and hardware interfaces, for example, a web interface or a graphical user interface (GUI), allowing the system 102 to interact with the user devices 104. Further, the interface 204 may enable the system 102 to communicate with other computing devices, such as web servers and external data servers (not shown in figure). The interface(s) 204 may facilitate multiple communications within a wide variety of networks and protocol types, including wired networks, for example, LAN, cable, etc., and wireless networks, such as WLAN, cellular, or satellite. The interface(s) 204 may include one or more ports for connecting a number of devices to each other or to another server.

The memory 206 can include any computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes. In one embodiment, the memory 206 includes module(s) 208 and data 210. The module(s) 208, amongst other things, includes routines, programs, objects, components, data structure, etc., that perform particular task or implement particular abstract data types.

In one implementation, the module(s) 208 may include a registration module 212, an interface module 214, the authentication module 116, and other modules 216. The other modules 216 may include programs or coded instructions that supplement applications and functions of the system 102. It will be appreciated that such modules may be represented as a single module or a combination of different modules. Additionally, the data 210 serves, amongst other things, as a repository for storing data fetched, processed, received and generated by one or more of the modules 208. In one implementation, the data 210 may include, for example, user(s) data 218, tag libraries 220, and other data 222. In one embodiment, the data 210 may be stored in the memory 206 in the form of data structures. Additionally, the aforementioned data can be organized using data models, such as relational or hierarchical data models.

As mentioned earlier, the system 102 may be coupled to the system repository 110, which can further include the metadata repository 112 and the application data repository 114. As described with reference to FIG. 1, the metadata repository among other things can include a mapping of each user with the application roles, and accordingly, the applications, user interfaces (UIs), and user interface (UI) elements accessible to each user. Further, the application data repository 114 may be adapted to host application data 223 for the plurality of users. In an embodiment, the application data repository 114 can include actual data associated with the application roles, the applications, the UIs, and the UI elements. In an example, the plurality of users may be an enterprise and its member companies. In another example, the users can be all the members of an organization in the hierarchical structure, from, say owners of that organization to employees working as team members. The application data 223 may include information about the applications that may be supported by the enterprise system 108. For each application, the application data repository 114 may include information about the content objects that may be accessible to various users of the application. In an implementation, the content objects may include UIs and UI elements. Details about these UIs and the UI elements may be stored in the application data repository 114 as user interface(s) data 224 and user interface element(s) data 226 respectively.

Further, according to an implementation, the enterprise data that each user may have access to may be defined by the system 102. The data accessible to each user may be then procured from the enterprise system 108, and rendered according to the applications, UIs, and UI elements associated with that user. In said implementation, to define the access of enterprise data, the system 102 may be configured to define and associate a plurality of rules with each of the users, based on which the enterprise data may be accessed by the users. Information about the plurality of rules may also be stored in the application data repository 114 as rule(s) data 228.

In an implementation, the enterprise system 108 can be accessed through the system 102 by the plurality of users through the user devices 104. To allow such access, the registration module 212 may be configured to register the plurality of users with the system 102. In an implementation, the registration of the plurality of users may be a one-time registration. The plurality of users may get registered with the system 102 through the user devices 104. Further, the registration module 212 may create and maintain profiles for each of the plurality of users that may get registered with the system 102. The profiles of the plurality of users may include amongst other details, identification details of the plurality of users. The identification details may include login credentials, such as a user ID and a password of the plurality of users. In one implementation, the login credentials may include biometric information related to the plurality of users. For example, the biometric information may include fingerprints, iris scan, and the like. The login credentials of the plurality of users may be stored as user(s) data 218.

Further, the registration module 212 may be configured to assign one or more application roles to the plurality of users registered with the system 102. As mentioned earlier, the application roles may enable the user to selectively access the enterprise data. The one or more application roles may include developers, data architects, module leaders, projects leaders, and stakeholders. Furthermore, the privileges may restrict access to the module(s) 208 and/or the data 210, based on the application roles associated with the user. The one or more application roles may enable the plurality of users to access the content of various applications based on access permissions associated therewith, for accessing the enterprise data. As mentioned earlier, the plurality of users may access the content objects by means of the plurality of user devices 104. In an implementation, if the plurality of users belongs to an organization, they may have pre-defined organization roles. An organization role may indicate profile of a user in an organization. Examples of the organization roles may include roles for operational supervisory, policy making, and executive functions. In an implementation, the application roles may be assigned on the basis of hierarchy in the organization. For example, those lower in the hierarchy may be forbidden from accessing information that may be accessible to those higher in the hierarchy, such as information regarding employee performance.

The enterprise data accessible to each of the application roles is associated with a plurality of rules. The plurality of rules may be associated with security of the enterprise data at different levels. For example, the plurality of rules may be associated with the applications being supported by the enterprise system 108. The plurality of rules may also be associated with the content objects, i.e., UIs and UI elements that may be provided for a particular application. Additionally, the plurality of rules may be configured to define extent of access that may be associated with each of the users. For example, whether a user can modify the applications, the UIs, or the UI elements for accessing the data may be defined by configuring rules. In said example, the rules for allowing or disallowing such access to the users can be based on the application role. In an example, a Chief Executive Officer (CEO) of an organization can be allowed to access the UIs and UI elements of all the users and modify the same. On the other hand, a team member may only be given enough access to personalize the accessible UI elements. Hence, as will be understood, the plurality of rules may be configured to provide security to the content objects of the framework from unauthorized access.

Further, the registration module 212 may facilitate use of filters on the rendered content objects according to the access permissions and roles associated with each of the users. Examples of the filters may include, but are not limited to, drop downs, input boxes, clickable charts, and maps. The filters may facilitate interaction between the users and the enterprise system 108 and allow the users to filter the content objects into smaller subsets. Further, according to an implementation, the registration module 212 may facilitate the users to create filters for the UIs. The filters may be applied to the UIs to restrict rendering of data being provided on the UI, which is explained in detail later. In addition, the registration module 212 may provide a reload option to the users, when the users may have created more than one filter for the UI. The reload option facilitates the users to refresh the UI with the information in accordance with the filters selected by the users. The registration module 212 may also facilitate the users to assign a default value to the filters. The default value may be set during the creation of the filters for the UIs. Further, the framework provided by the system 102 may include a menu option that may provide a list of all the UIs that may be mapped to the application roles of the users.

Furthermore, the registration module 212 may facilitate the users to define parameters based on which the enterprise data may be rendered. The parameters may refer to the criteria based on which the content objects may be provided to the user. In an implementation, the parameters may be provided values as per the requirement of the user. In an example, date may be added as a parameter. If 'date' parameter is provided a value of 1 date-wise content will be displayed on the UI. In another example, border may be added as a parameter. In case, 'border' parameter is provided a value of 0, the UI is provided without a border. In yet another example, if the UI is created in an enterprise environment, the parameters may be set as various departments (sales, human resource, production, development, and so on) of the enterprise to view contents related to each department.

In an embodiment of the present subject matter, the parameters may be provided a default value. In an example, the default values may be set when the UI is rendered for a first time, and may be changed by an administrator at any time. Examples of the content objects may include, but are not limited to, data such as, tabular data, images, and objects. In an embodiment, whenever a filter is applied to the UI, the parameters associated with that filter may appear in a filter tab. In another embodiment, the registration module 212 may facilitate the users to provide a name to the filter. Accordingly, multiple filters may be grouped according to the name given to the filters.

In one implementation, the registration module 212 may associate privileges with the application roles for facilitating the plurality of users to perform operations in relation to the rendered content objects. The privileges may pertain to restrictions on the content objects that the user may be permitted to view or access. Further, the registration module 212 may associate the content objects provided by the system 102 with the application roles assigned to the plurality of users. In an example, the access permissions as well as the privileges associated with the application roles can be based on the rules associated with the application roles. Accordingly, all actions permissible to the user may be authorized based on the application roles associated with the user.

The registration module 212 may also enable the user to specify an auto-refresh time for the UI of the system 102. The auto-refresh time may enable data rendered on the UI to be updated for the user after the specified auto-refresh time. Additionally, in an implementation, the registration module 212 may facilitate the plurality of users to define parameters for the UIs. The parameters may refer to the criteria based on which content objects may be provided on the UIs. The parameters may be related to various tasks of an organization. Examples of the parameters may include timeliness specifications, due date, and status of various tasks. In an implementation, the registration module 212 may facilitate the users, based on, for example, the privileges and permissions, to provide values to the parameters as per the requirement of the user.

In one implementation, the registration module 212 may enable the users to select a position of the various UI elements on the UI. The system 102 as disclosed in the present subject matter may enable the users to re-arrange the UI elements of the various UIs accessible to the user. The registration module 212 may also be configured to enable the administrator to define various attributes with reference to the UI elements. For example, the administrator may define read/write attributes to the various UI elements. It will be understood that the attributes may be associated with application roles of the users and the rules for permissions associated therewith.

Once the users have been registered with the system 102, the system 102 can allow the users to access the enterprise data in the enterprise system 108. To allow the access to the users, in an implementation, the authentication module 116 of the system 102 may be configured to authenticate each user whenever the user tries to access the enterprise system 108. In another implementation, the user access may be authenticated once, say in case the user is logging in from an administrator device, and subsequently, the user can be allowed access without any login credentials.

In an implementation, the authentication module 116 may retrieve the application role assigned to the user. For example, a user may provide his credentials to access the system 102. In one implementation, various details pertaining to the user, such as login credentials, access permissions, and personal details may be stored as user(s) data 218. If the credentials stored in the user(s) data 218 and the credentials entered by the user do not match, the user may be denied access to the enterprise system 108. If the credentials entered by the user and the credentials stored in the user(s) data 218 match, the authentication module 116 may allow the user to access the enterprise system 108, and hence, the enterprise data.

Further, based on the user profile or the application role or both, the authentication module 116 may also verify the content objects, i.e., UIs and UI elements authorized to be accessed by the user. The verification may be based on the plurality of rules associated with the UIs. The authentication module 116 may further retrieve the content objects, such as the applications, UIs, and UI elements, associated with the application role of the user. The user device 104 may then display the content objects in the form of texts and graphs on the UI. In an implementation, the system 102 may send the content objects to the user device 104 in the form of really simple syndication (RSS) feeds. The RSS feeds are compatible with a variety of devices, such as a desktop computer, a laptop, and a mobile phone. Hence, the system 102 may facilitate display of information on a variety of devices, thereby providing the user the flexibility to view the content objects from different places.

In an embodiment, the interface module 214 may facilitate the plurality of users to use the user devices 104 and access the enterprise data in the enterprise system 108. In an implementation, the system 102 may import information from multiple data sources including spread sheets and flat files in the enterprise data. The interface module 214 of the system 102 may be configured to provide UIs to the plurality of users. In an example, the interface module 214 can configure the UIs in such a way that the UIs may provide a composite view of information to the plurality of users. Further, the interface module 214 may communicate with the application data repository 114 for displaying the content objects associated with the application role of the user. The UIs may be configured to render the content objects, such as the UI elements, based on the application roles of the plurality of users. In an implementation, the content objects may include graphs, charts, and reports.

In an exemplary embodiment, the user may provide an input to the system 102 through the user device 104. The input may include a user ID of the user; however, it will be evident that the input may include any other information for authenticating the user. Further, the user may provide a UI name where the user may want to render UI elements. The interface module 214 may accordingly fetch the appropriate UI for the user. Further, the UIs provided by the interface module 214 along with various settings data, such as parameters, layouts, and refresh time may be stored as UI data 224. The UI data 224 may be edited or modified by an authenticated user. The authenticated user may only be authorized to edit the UI data 224 associated with him. It will be evident that the UIs will be specific for each application being supported by the framework and therefore, the UI data 224 will be maintained by the application data repository 114 of the system repository 110.

In another embodiment, the interface module 214 may facilitate the users to create UI elements, such as charts, reports, and graphs based on the content objects imported from an external database. In an implementation, the external database may be an application specific database. In said embodiment, the UI elements may be grouped together and such groups may be mapped to a single UI. As mentioned earlier, the users may be assigned permissions or privileges based on the application roles assigned to each of the users.

In said embodiment, the interface module 214 may enable the users to execute a custom logic that may be written based on the metadata. The custom logic may be written by using tag libraries that may be pre-defined either in the system 102 or the metadata repository 112. A custom tag library may refer to a set of custom tags that may invoke custom actions in a file. The custom tag libraries are typically created by users who may be proficient in a programming language and may be used by those users who may be novice in the programming language, but would like to enhance their UIs by taking advantage of the custom tag libraries. The custom tag libraries, therefore, reduce the task of embedding excessive amounts of code in UIs by moving the functionality provided by the tags.

Further, the custom tag libraries may be provided by the metadata driven framework and may enable the user of the system 102 to render data from multiple resources. The information related to the custom tag libraries may be stored in tag libraries 220. It will be understood that although the tag libraries 220 are shown internal to the system 102, the tag libraries 220 may also be provided external to the system 102. The users may access the custom tag libraries 220 stored in the system 102 through the user devices 104 for creating personalized UI elements by writing a custom logic.

In an implementation, the system 102 may store an output of each of the UI elements in a variable. This variable may be used in the custom logic written by the user. As described earlier, the custom logic may include one or more of the tag libraries provided by the framework. Further, the custom logic may process data stored in the variable and may provide information in accordance with the processing.

Accordingly, the custom logic may decide what information to be provided and in what format the information may be provided.

Further, in an implementation, the content objects can be personalized after being rendered on a screen of the user device 104. In said implementation, the users may resize the plurality of UI elements and provide inputs to the interface module 214 to achieve the resizing. For example, when a user needs to refer to multiple UI elements, the user may resize the UI elements to fit in a single UI. This may enable the user to get a composite view of all the UI elements without switching between the multiple UI elements. Accordingly, the interface module 214 can read the user input, and resize the UI elements, for example, by reading a gesture of an input device, say a mouse, a stylus, or a hand gesture on a touch screen. In an implementation, the user may or may not be authorized to edit or resize a UI element, based on the application roles associated with the user. In an implementation, some of the UI elements configured by the interface module 214 may automatically resize themselves based on the amount of the data being displayed.

In an implementation, the interface module 214 may facilitate the users to add filters for refining results obtained from the queries submitted by the users. For example, the interface module 214 may retrieve the data in the form of a report. The interface module 214 may facilitate customization of the report by providing a drill-down feature for the users. The drill-down feature may enable the users to view details at a granular level of the report. In an implementation, the report may be generated using data from the system repository 110 and external data sources. Accordingly, the metadata driven framework may support relationship between various sources.

In an implementation, the one or more filters may be retrieved by the interface module 214 in an order of creation of the one or more filters. The interface module 214 may also identify a list of UI elements associated with a filter from the one or more filters. The user device 104 may be used by the user for providing a value to the one or more filters. The user may either provide a default value or a run time value to the one or more filters. Thereafter, through the custom logic, the user may retrieve UI elements based on the application role of the user. Here also, the UI elements may be retrieved in an order of creation of the UI elements. The user may also specify the position of the UI element on the UI through the custom logic. Accordingly, the system 102 may facilitate the user to create the custom logic to place the UI elements in the specified position of the UI.

Further, based on the permissions and privileges, a user may query the system 102 and obtain results. In an implementation, the privileges may pertain to various types of queries that may be submitted by the user to the framework of the system 102. In an example, the user may create a table for logging defects identified in an application. At a later stage, if the user wants to check the number of defects that were logged in the month of April, the system 102 may facilitate the user to run a query on that table through the user device 104. Further, the interface module 214 may be configured to provide an output of that query in accordance with the requirements of the user. In a scenario of the above example, the system 102 may provide information related to a query, submitted by one of the plurality of users through one of the user devices 104, for viewing the number of defects that were logged for various projects. In another implementation, all users query the system 102 but the results may vary from user to user based on the application roles and permissions granted to the users.

In an embodiment, the interface module 214 may configure the UI elements on the UIs based on the one or more application roles of the plurality of users. Examples of the UI elements may include charts, graphs, reports, and the like. In an implementation, the parameters defined for the UIs may decide which UI elements may be rendered to the users. Further, the interface module 214 may enable the users to customize the UI elements. The system 102 may allow the users to customize the UI elements through the user devices 104. The users may select the UI elements they would like to view, may format each of the UI elements in a different manner, and the like.

In an embodiment, the metadata driven framework of the present subject matter may be a generalized framework that may store any data and may configure different views in a generalized manner. The framework may thus provide a customized view that may be generated in real time.

Considering an example of an incident management process with respect to a help desk application. In the present example, the system 102 of the present subject matter as described herein may include resources, such as users and the data to be accessed by the users, i.e., incidents. The users may include an incident creator, an incident owner, and an incident analyst. In an implementation, each of the above users may be assigned different application roles. Further, the users may be assigned application roles based on their organizational roles, i.e., based on their profiles in an organization. As described above, the users may be provided privileges based on their respective application roles and the rules associated with the application roles.

In said example, the organization role of the incident creator may be to log various incidents. Further, the organization role of the incident owner may include assigning the logged incidents to the incident analyst along with setting targets for resolving the incidents. In addition, the profile of the incident analyst according to the organization role may include maintaining actual time taken for resolving the incidents.

The process of rendering role-based content based on, for example, application roles, of the users is explained in conjunction with FIGS. 2*a* to 2*g*. FIGS. 2*a* to 2*d* illustrate UIs for defining various application roles and rules for a user. As described earlier, the registration module 212 may be configured to perform the functions as depicted in FIGS. 2*a* to 2*d*. In an implementation, an administrator, such as a database administrator (DBA), may be configured to access these UIs. As described earlier and also shown in FIGS. 2*a* to 2*g*, the UIs can be a webpage or a display page of an application.

Figures 2A, 2B:
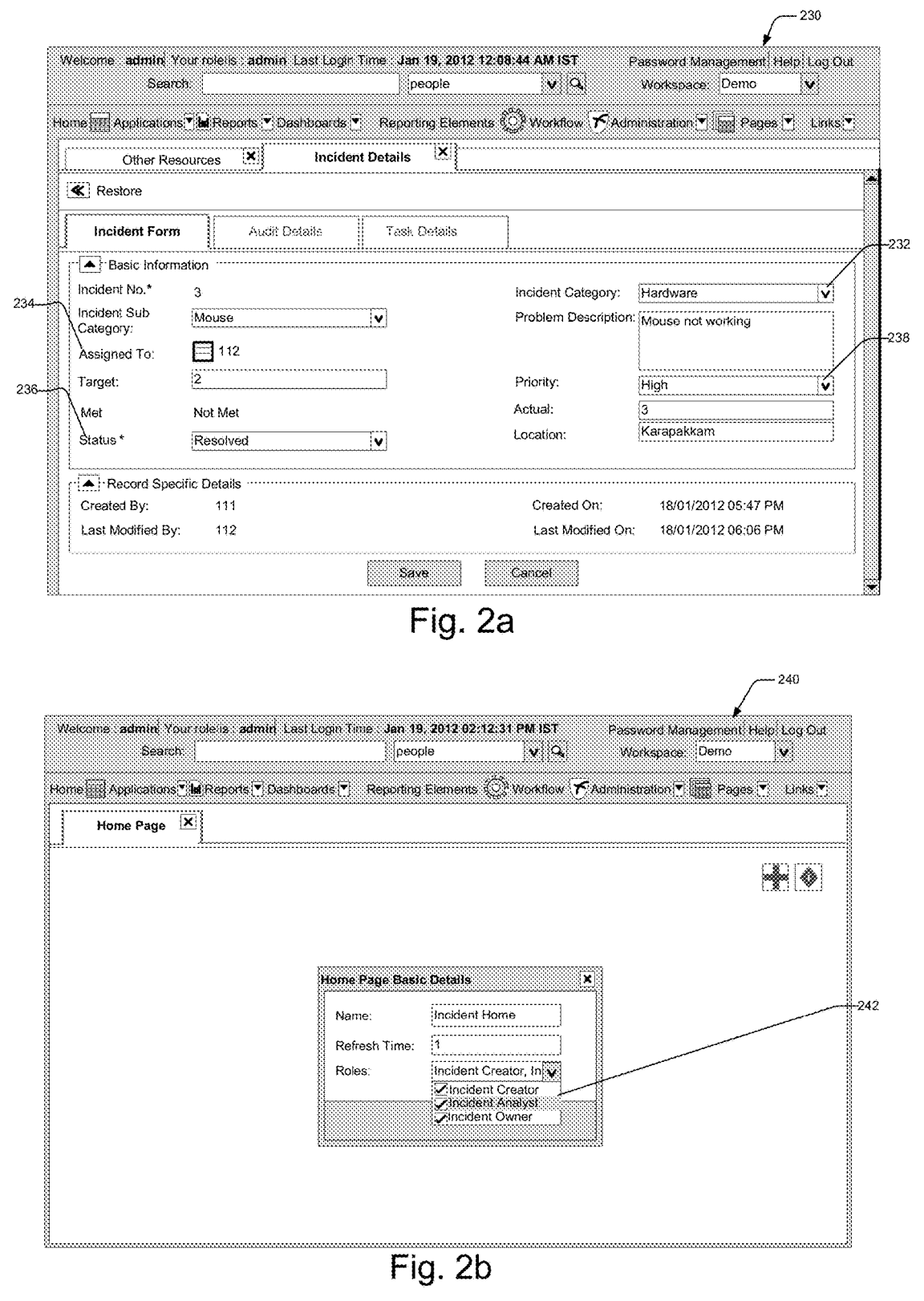

Referring to FIG. 2*a*, a UI 230 depicting details of a logged incident is illustrated in accordance with an embodiment of the present subject matter. The incident may fall under various categories 232, such as hardware, software, and networking. The UI may also provide assignment information 234 that describes about a user to whom the incident may be assigned for resolving the incident, status information 236 that may include information about current status of the incident, priority information 238 that indicates priority of the present incident, and the like. Based on the above information, the system 102 may facilitate users to generate various UI elements, such as reports. In an exemplary embodiment, the reports may include a status wise count of incidents recorded in the incident management system, priority wise count of incidents, and met/non-met count of incidents. FIG. 2*b* illustrates association between a UI 240 and an application role from a plurality of application roles 242.

Figures 1, 2C:
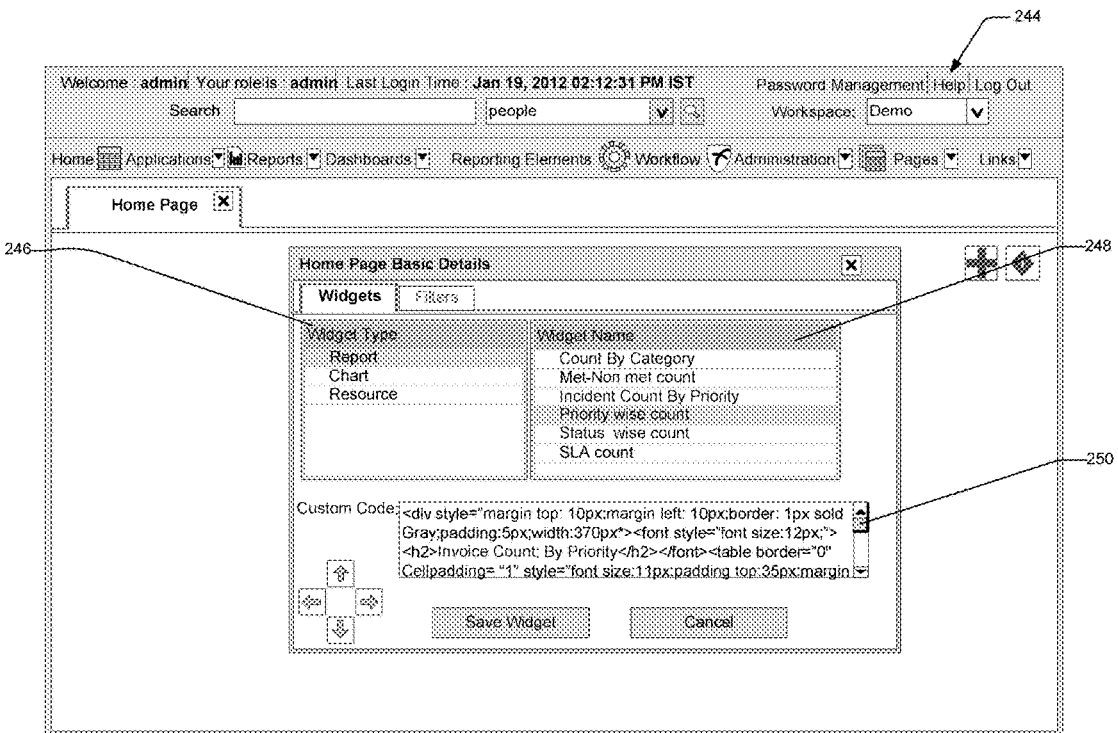
Figures 2, 2C:
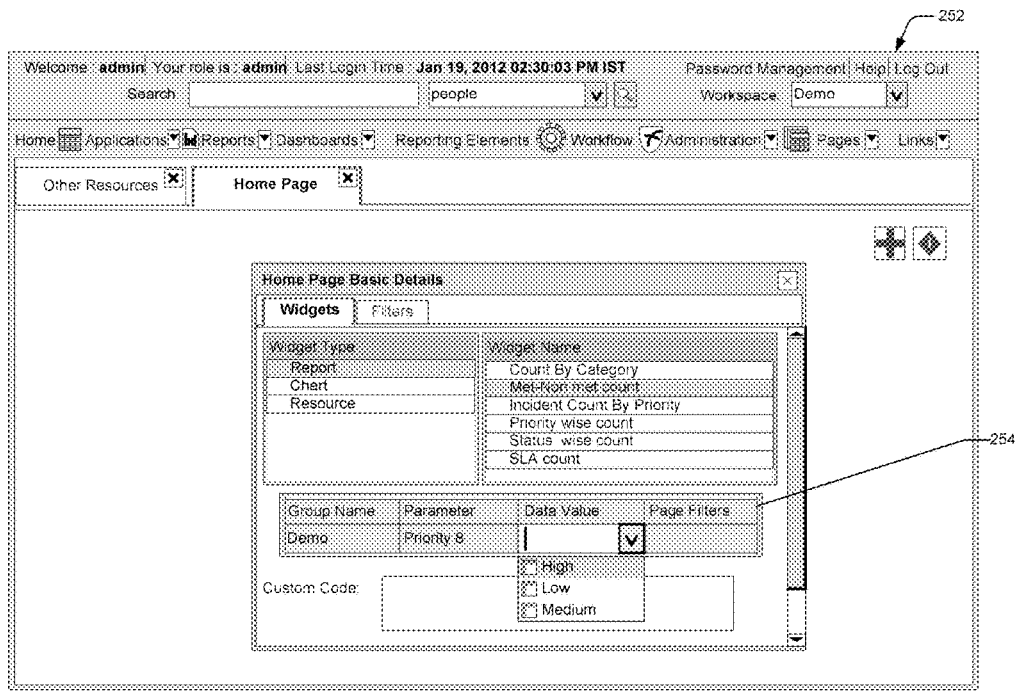

Referring to FIG. 2c-1, a UI 244 is illustrated for adding a UI element, such as a widget, in accordance with an embodiment of the subject matter. The UI element may be selected from a list indicating different types of UI elements 246, such as a report, a chart, and a resource. Further, each of the UI elements may be provided a name from a list of names of the UI elements 248. The names of the UI elements may reflect the content of the UI element. In FIG. 2c-1, the UI element may be a report based on priority wise count of the incidents. As mentioned earlier, the interface module 214 of the system 102 may facilitate the user to write a custom logic for creating the UI element. Such a custom logic 250 is also illustrated in FIG. 2c-1. In an implementation, filters may be provided for rendering selected content objects. FIG. 2c-2 depicts a UI 252 with which filters 254 may be associated. The filters 254 may be based on a parameter and may be provided a default value when rendered for first time.

Figure 2D:
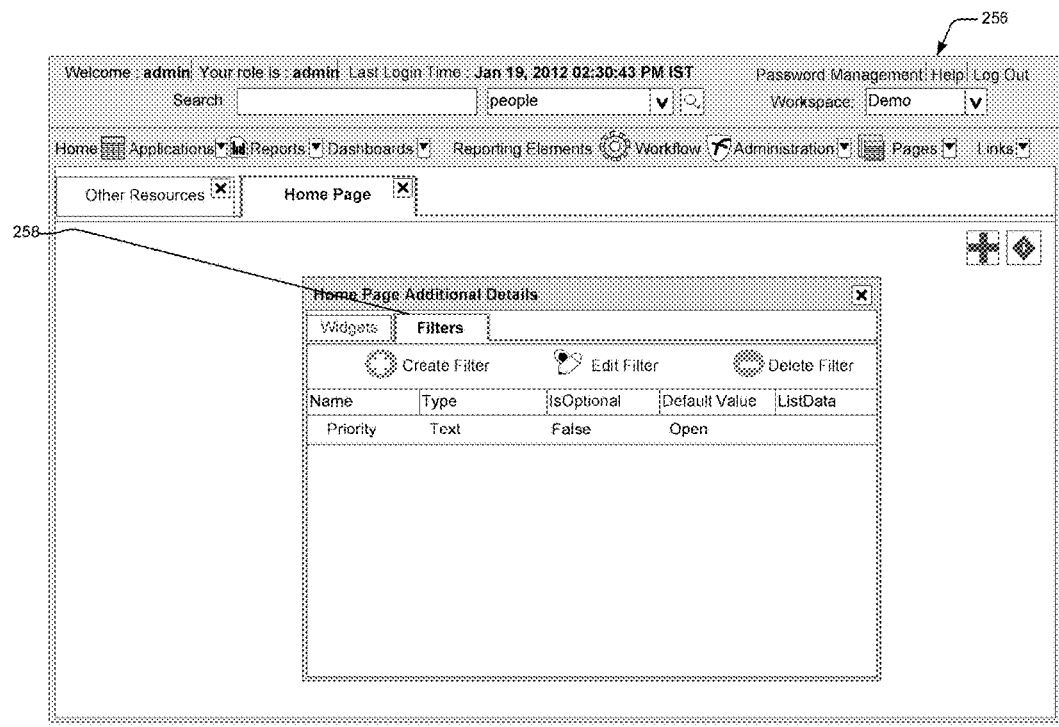
Figure 2E:
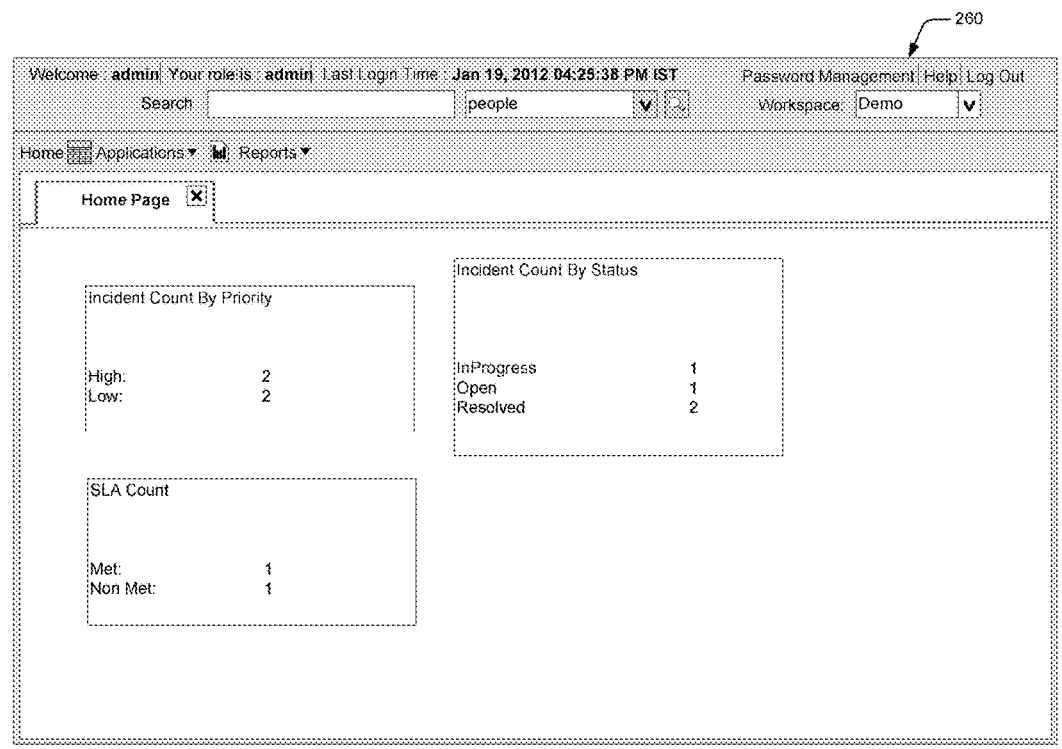

FIG. 2d depicts a UI 256 indicating a list of filters 258 that may be created by a user. The system 102 may facilitate the user to add more filters to the list by clicking on a 'create filter' tab. Further, FIG. 2e depicts a UI 260 for a user having the application role of the incident creator. The application role of the incident creator may authorize him to view all incidents logged by him. The UI may include UI elements, such as reports that may provide information about the incidents. For example, the reports may provide number of incidents based on their priority, their status, and count of the incidents based on a service level agreement (SLA).

Figure 2F:
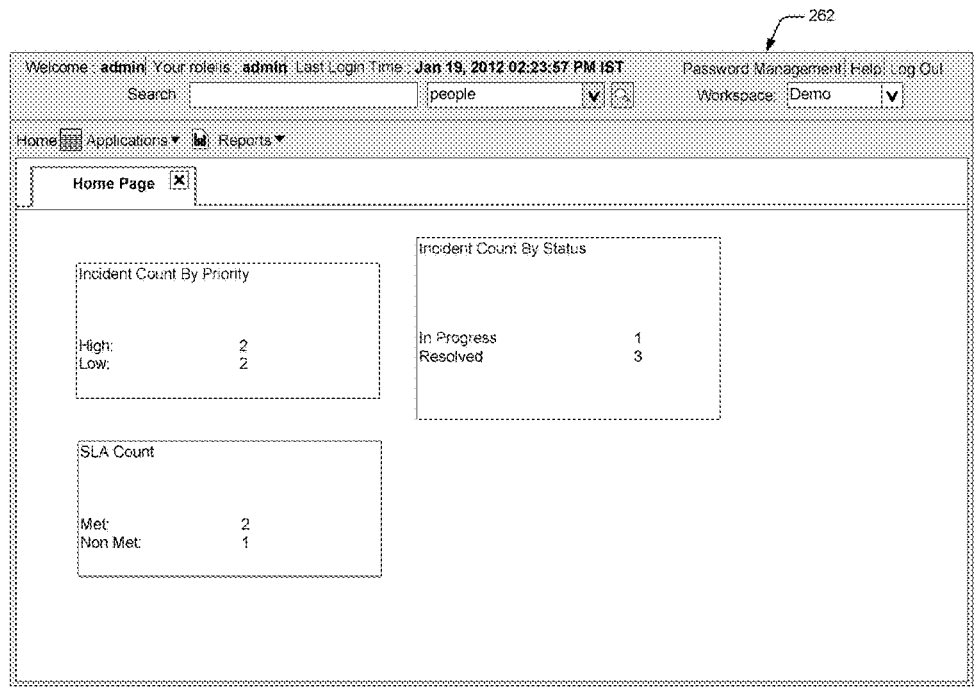
Figure 2G:
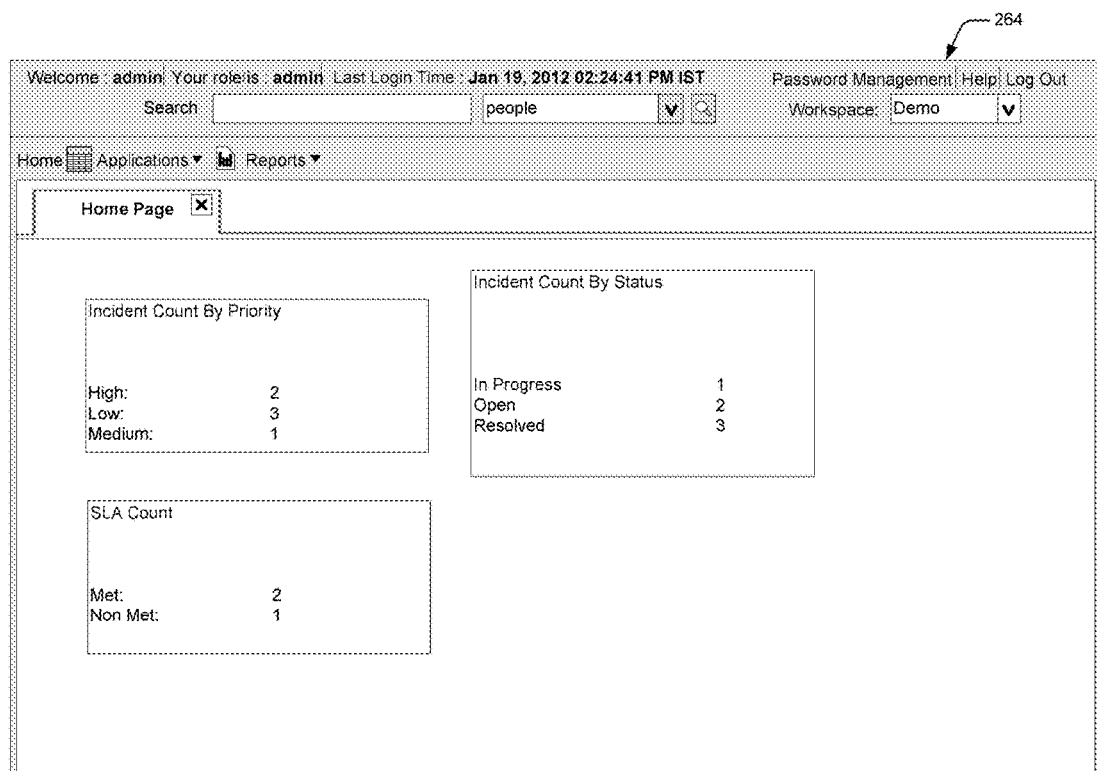

FIGS. 2f & 2g represent UIs 262 and 264 for the incident analyst and the incident owner respectively. As described with respect to the incident creator, the incident analyst and the incident owner may view information based on their application roles. The incident analyst may be privileged to view the incidents that may be created by him as well as the incidents that may be assigned to him. Further, the application role of the incident owner may enable him to view only those incidents that may be raised in his location, and also view a status of the incidents resolved by the incident analyst. It will be understood that even though the UI elements remain same for the three application roles, the rendered content may be different. In an implementation, the interface module 214 of the system 102 may facilitate the users to add more UI elements to their UIs based on their application roles.

Figure 3:
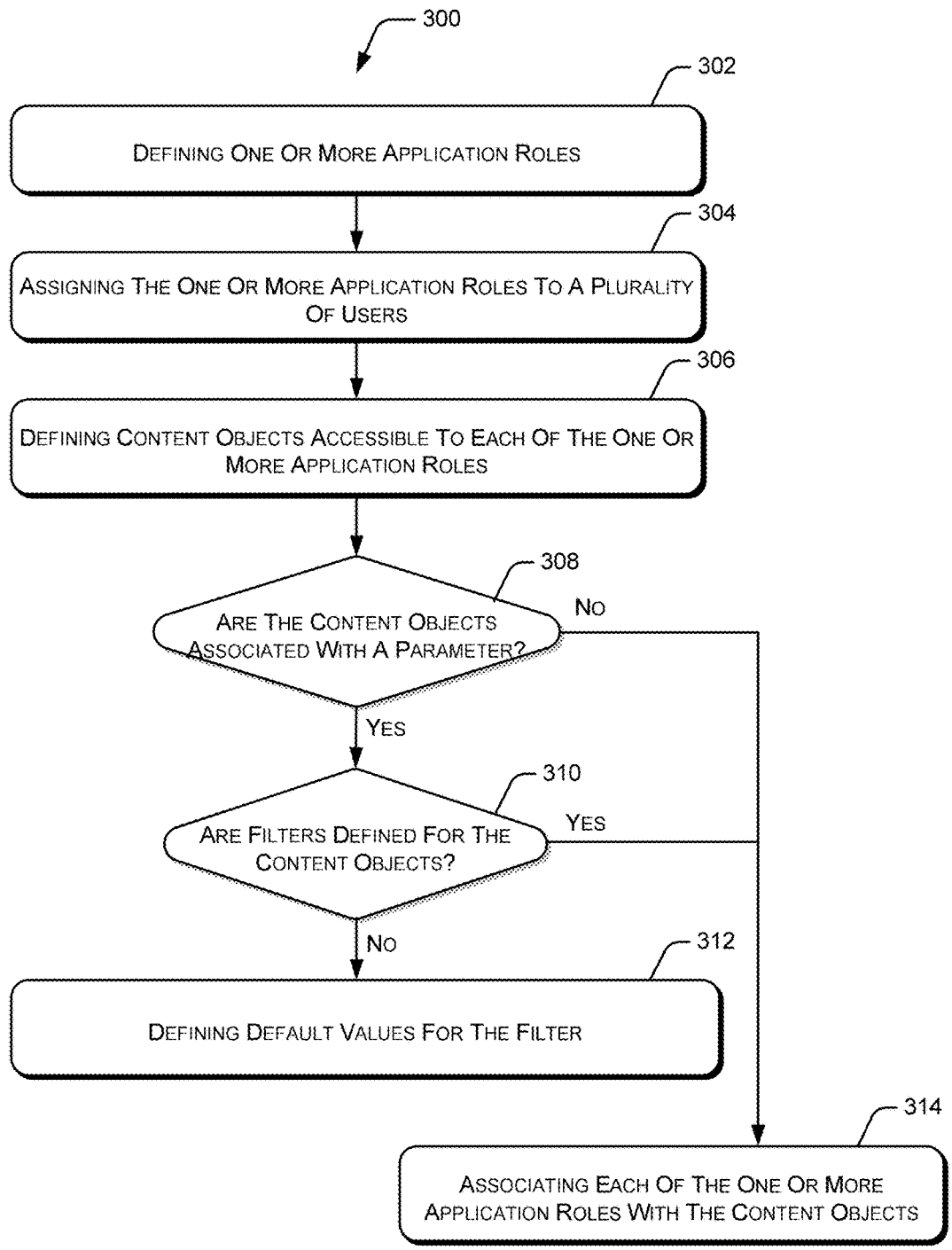
FIG. 3 illustrates a method for implementing role-based content rendering, in accordance with an embodiment of the present subject matter.
Figure 4:
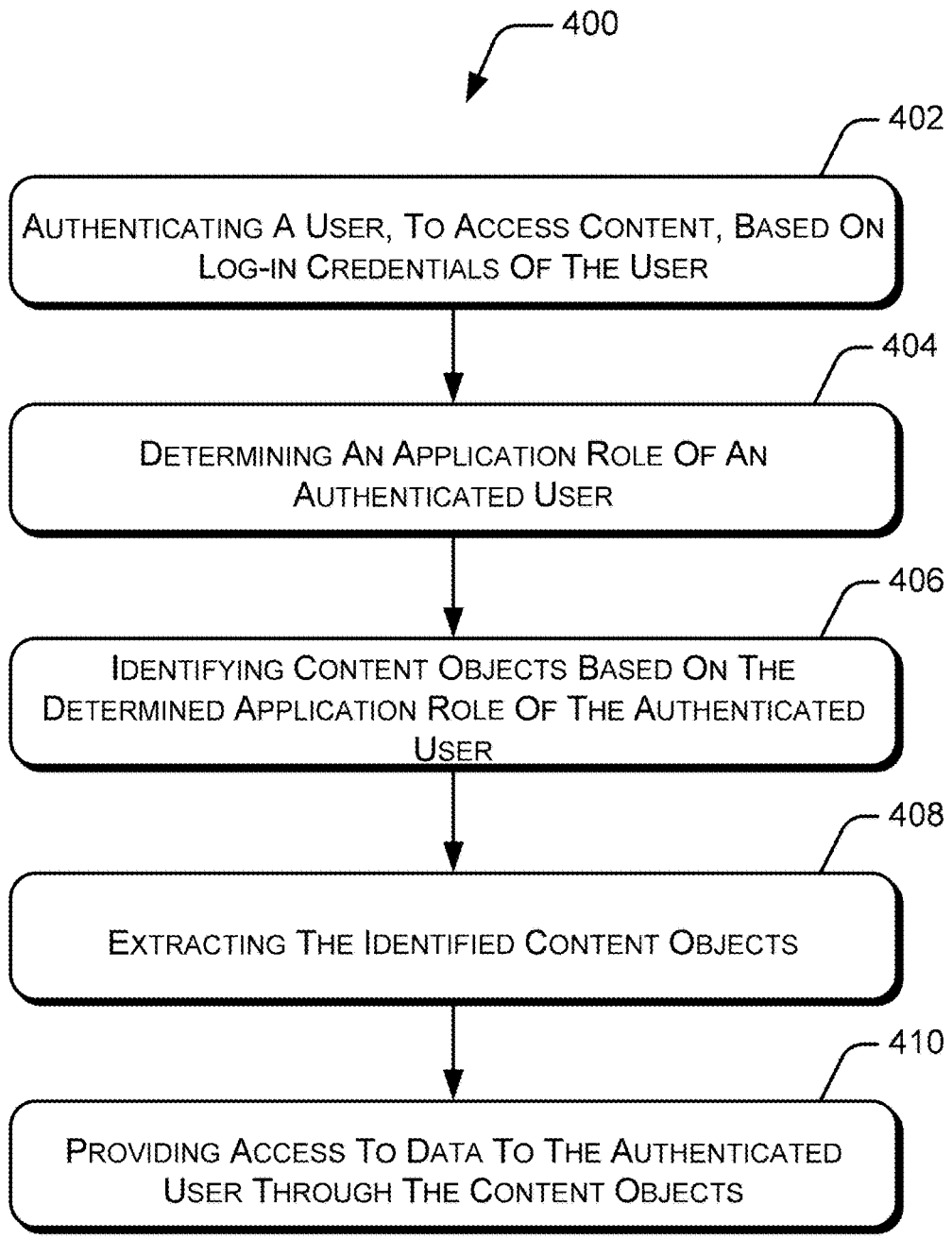
FIG. 4 illustrates a method for role-based content rendering, in accordance with an embodiment of the present subject matter.

FIG. 3 illustrates an exemplary method 300 of associating content with the one or more roles, in accordance with an embodiment of the present subject matter, whereas FIG. 4 illustrates a method 400 of rendering role-based content to an authenticated user, in accordance with an embodiment of the present subject matter. The methods 300 and 400 may be described in the general context of computer executable instructions. Generally, computer executable instructions can include routines, programs, objects, components, data structures, procedures, modules, functions that perform particular functions or implement particular abstract data types. The methods 300 and 400 may also be practiced in a distributed computing environment where functions are performed by remote processing devices that are linked through a communication network. In a distributed computing environment, computer executable instructions may be located in both local and remote computer storage media, including memory storage devices.

The order in which the methods 300 and 400 are described is not intended to be construed as a limitation, and any number of the described method blocks can be combined in any order to implement the methods 300 and 400, or alternative methods. Additionally, individual blocks may be deleted from the methods 300 and 400 without departing from the spirit and scope of the subject matter described herein. Furthermore, the methods 300 and 400 can be implemented in any suitable hardware, software, firmware, or combination thereof.

In accordance with one embodiment of the present subject matter, the methods 300 and 400 may be implemented in the previously described system 102. However, it will be appreciated by one skilled in the art that such an implementation is not limiting. The methods 300 and 400 may be implemented in a variety of systems, such as performance monitoring systems and the like.

With reference to the method 300 depicted in FIG. 3, at block 302, one or more application roles may be defined. The application roles may define access permissions that the user may have to access information recorded in the metadata driven framework of the system 102. In an embodiment, the registration module 212 may be configured to define the one or more application roles.

At block 304, the one or more application roles may be assigned to a plurality of users of the framework. The one or more application roles may enable the plurality of users to access the enterprise data. In one implementation, the registration module 212 may be configured to assign the one or more application roles to the plurality of users during the initial setup stage. In said implementation, the registration module 212 may associate privileges with the one or more application roles for facilitating the plurality of users to perform various operations in relation to the enterprise system 108.

At block 306, content objects that may be accessible to the plurality of users may be defined. In an implementation, the content objects may be defined on the basis of the privileges associated with the one or more application roles of the plurality of users. The registration module 212 may be configured to define the content objects for the plurality of users. In an embodiment, the content objects may include UIs and associated UI elements. A UI may define a workspace for a user from the plurality of users. The UI may include data, such as one or more UI elements and other information that may be obtained from external sources.

At block 308, it is checked if a parameter is associated with the content objects. The parameter may refer to a criteria based on which the content objects may be provided to each of the plurality of users. In an implementation, the registration module 212 may facilitate the user may provide a value to the parameter through the user device 104. The value may be provided as per the requirement of the user. The registration module 212 may be configured to facilitate the user to interact with the system 102. If the parameter is associated with the content objects, the method 300 moves to block 310.

At block 310, it is checked if a filter may be defined for the content objects. The filter may be based on the parameter associated with the content objects. In an implementation, the filter may be defined for both the UIs and the associated UI elements. The filters may include, but are not limited to, drop downs, input boxes, clickable charts, and maps. Further, the filters may facilitate interaction between the user and the enterprise system 108 and allow the user to filter the content objects into smaller subsets. In said implementation, the registration module 212 may enable the user to define filters for the content objects accessible to the user.

If the filter is not defined for the content objects, the method 300 moves to block 312. At block 312, the registration module 212 may facilitate the user to define a default value for the parameter associated with the content objects. The default value for the parameter may be set when the content objects are rendered for a first time and may be changed by the DBA at any time. Further, upon defining the default value for the parameter, the method step at block 314 is executed to associate the content objects with the one or more application roles.

Referring back to block 308, if the parameter is not associated with the content objects ('No' path from block 308), then the method step at block 314. Additionally, if at block 310, the filters are pre-defined for the content objects ('Yes' path from block 310), the method step at block 314 is executed.

As mentioned previously, at block 314, the registration module 212 may associate each of the one or more application roles with the content objects. The association may include associating the content objects with each of the one or more application roles. Further, the content objects may be configured with a plurality of rules. The plurality of rules may be associated with the one or more application roles of the plurality of users. The plurality of rules may enable a user to access the content objects based on the application roles assigned to the user.

With reference to the method 400 depicted in FIG. 4, at block 402, a user from the plurality of users is authenticated. In an implementation, the authentication module 116 may be configured to authenticate the user. The user may be authenticated based on the login credentials of the user. As described earlier, the login credentials of the user may be stored as user(s) data 218 during an initial setup stage. The user may need to provide the login credentials through the user device 104. If the login credentials match with the stored credentials, the authentication module 116 may enable the user to access the system 102.

At block 404, based on the authentication, a user profile of the user may be retrieved by the authentication module 116. Further, based on the user profile, the authentication module 116 may determine an application role of the user. The application role may be configured to provide access of the metadata driven framework of the system 102. Again, as mentioned above, the user profile may be created during the initial setup stage by the registration module 212.

Further, at block 406, the authentication module 116 may identify the content objects that may be accessible to the user. In an implementation, access to the content objects of the metadata driven framework may be associated with the application role of the user. In an embodiment, the content objects may include at least one user interface (UI) and at least one UI element, such as a graph, a report, and a chart. The at least one user interface and the at least one user interface element may be customizable by the user. Further, details about the content objects associated with each of the application roles may be stored as user interface(s) data 224 and user interface element(s) data 226 respectively.

At blocks 408 & 410, the content objects identified at block 406 may be extracted by the interface module 214. The extracted content objects may then be provided to the user who may access the content objects through the user device 104.

It will be understood that although the foregoing description is provided with reference to rendering of content on the basis of application roles and the rules associated with the application roles, as described earlier, the rules for granting access to enterprise data and access and permissions related to the workspace, i.e., the applications, UIs, and UI elements, can be defined for each user individually. In such a case, the rendering of content can be directly based on the rules and not on the application roles. It will also be understood that categorization of users for associating access rules can be based on various parameters other than organization or application roles.

Although embodiments for a role-based content rendering system have been described in language specific to structural features and/or methods, it is to be understood that the invention is not necessarily limited to the specific features or methods described. Rather, the specific features and methods are disclosed as exemplary implementations for the role-based content rendering system.

We claim:
1. A computer implemented method comprising:
authenticating a user to access content associated with a metadata driven framework and the metadata driven framework is employed for defining a plurality of content objects for at least one application, the content comprising data and content objects related to one or more applications stored in one or more application data repositories, wherein the authentication is based on login credentials of the user, and wherein:
the content objects include a plurality of user interfaces (UIs) and UI elements to render role-based content of the one or more applications from the one or more application data repositories;
each of the plurality of UIs is associated with an application from the one or more applications and defines a workspace for the user; and
the UI elements include reports, graphs, and charts;
determining, by a processor, an application role associated with the user, wherein the application role defines an access permission for the user to selectively access content of the one or more applications in from the one or more application data repositories, wherein a query is automatically generated, upon authentication of the user, for rendering the content to the user;
identifying, by the processor, one or more of the content objects associated with the determined application role of the user, wherein the identification is based on a mapping of application roles with the content objects and a plurality of rules associated with each of the application roles, the plurality of roles defining access to the content objects for the associated application roles, and wherein the identifying of the one or more of the content objects comprises identifying a plurality of parameters associated with the identified content objects, the plurality of parameters referring to a criteria based on which the content objects are rendered to the user, wherein the plurality of UI elements associated with the user are defined based on access permissible to the user;
providing, by the processor, a plurality of pre-defined tag libraries to the user for defining a custom logic, wherein a tag library is indicative of a set of custom tags that invoke custom actions in a file stored in the one or more application data repositories, said application data repositories configured to receive at least one query from a user device and identify the location in the application data repository which the user device is seeking, wherein the custom logic defines a layout for customizing the identified content objects and the custom logic is written using a plurality of tag libraries pre-defined in the one or more application data repositories;
receiving, by the processor, the custom logic for rendering the identified content objects, based on the at least one application role, wherein the custom logic is defined by using the plurality of pre-defined tag libraries;

rendering, by the processor, the identified content objects accessible to the user based on the defined custom logic and modifying the identified content objects based on users privileges, wherein the custom tag libraries provided by the metadata driven framework enables the user to render data from a plurality of resources by configuring the custom logic to provide a plurality of user inputs on a screen;

associating, by the processor, at least one user defined filter on the rendered content, wherein the user defined filter creates a subset of the rendered content, and configuring a plurality of rules to define and control data access based on at least pre-defined application role wherein the configured plurality of rules secure the identified content objects from unauthorized access;

defining, by the processor a model of the metadata driven framework, wherein at least one of User Interface (UI) and User Interface (UI) elements create a dependency relationship, wherein each UI is mapped with one or more UI elements, and wherein the metadata driven framework is configured to support rendering of data in a plurality of formats, by providing a one-line status within the UI to access further information; and reading, by the processor, a plurality of user inputs and resizing the one or more UI elements by reading a gesture of an input device, wherein the input device is at least one of a stylus, a hand gesture, or a touch screen.

2. The computer implemented method as claimed in claim 1 further comprising defining, by the processor, one or more filters for the identified content objects based on the application role associated with the user, wherein the one or more filters are applied to the identified content objects to restrict rendering of data provided by the identified content objects.

3. The method as claimed in claim 1, wherein the content is retrieved from multiple data sources associated with an enterprise.

4. The method as claimed in claim 3, wherein the multiple data sources include at least one of spreadsheets, flat files, and external databases.

5. The method as claimed in claim 1 further comprising updating content rendered by the content objects based on an auto-refresh time specified by the user.

6. The system as claimed in claim 1, wherein the modifying comprises changing and redefining the layout of the UI.

7. A system comprising:
a processor; and
a memory coupled to the processor, the memory comprising:
a registration module configured to,
assign at least one application role from a plurality of pre-defined application roles to a user for providing selective access to content associated with a metadata driven framework to the user, wherein the content comprises data and content objects related to one or more applications in an one or more application data repositories wherein:
the content objects include a plurality of user interfaces (UIs) and UI elements to render role-based content of the one or more applications from the one or more application data repositories;
each of the plurality UIs is associated with an application from the plurality of applications and defines a workspace for the user; and the UI elements include reports, graphs, and charts; and
associate the at least one application role with one or more of the content objects, the content objects being determined based on metadata associated with each of the plurality of users, wherein access of data using the content objects is determined for each of the plurality of users based on the associated one or more application roles, the association comprises defining a plurality of parameters associated with the content objects for rendering the content, the plurality of parameters referring to a criteria for providing the content objects to the user;

associate at least one user defined filter on the rendered content, wherein the user defined filter creates a subset of the rendered content, and configure a plurality of rules to define and control data access based on at least a pre-defined application role, wherein the configured plurality of rules secure the identified content objects from unauthorized access;

facilitate use of said at least one user defined filter on the rendered content objects based on at least one of access permissions and roles associated with the user; and an authentication module configured to,
authenticate the user from a plurality of users to access the content, the user is authenticated based on login credentials, associated with a metadata driven frame work and the metadata is employed for defining a plurality of content objects for at least one application, the content comprising data and content objects related to one or more applications stored in one or more application data repositories;

determine at least one application role from the plurality of pre-defined application roles associated with the user, wherein the determination is based on a user profile of the user, wherein a query is automatically generated, upon authentication of the user, for rendering the content to the user, and the application role defines an access permission for the user to selectively access content of one or more applications from one or more application data repositories;

identify the content objects associated with the determined at least one application role of the user, wherein the identification is based on mapping plurality of pre-defined application roles with content objects and a plurality of roles associated with each of the pre-defined application roles, the plurality of rules defining access to the one or more content objects for the associated application roles, and wherein the identifying of one or more content objects further comprises identifying a plurality of parameters associated with the identified content objects, wherein the plurality of UI elements associated with the user are defined based on access permissible to the user;

provide access of one or more of the content objects to the user, and a plurality of pre-defined tag libraries to the user, based on the identification for defining a custom logic, wherein a tag library is indicative of a set of custom tags that invoke custom actions in a file stored in the one or more application data repositories, said application data repositories configured to receive at least one query from a user device and identify the location in the application data repository which the user device is seeking, wherein the custom logic defines a layout for customizing the identified content objects and the custom logic is written using a plurality of tag libraries pre-defined in the one or more application data repositories;

render, the identified content objects accessible to the user based on a defined custom logic, wherein a plurality of custom tag libraries provided by the metadata driven framework enables the user to render data from a plurality of resources;

define, a model of the metadata driven framework, wherein at least one of User Interface (UI) and User Interface (UI) elements create a dependency relationship, wherein each UI is mapped with one or more UI elements and wherein the metadata driven framework is configured to support rendering of data in a plurality of formats, by providing a one-line status within the UI to access further information; and read, by processor, a plurality of user inputs and resize the one or more UI elements by reading a gesture of an input device, wherein the input device is at least one of a stylus, a hand gesture, or a touch screen.

8. The system as claimed in claim 7, wherein the memory further comprises an interface module configured to allow, based on the at least one application role, the user to define a custom logic for defining a layout to customize the identified content objects, wherein the custom logic is defined using a plurality of pre-defined tag libraries, and wherein a tag library is indicative of a set of custom tags that invoke custom actions in a file stored in the one or more application data repositories.

9. The system as claimed in claim 7, wherein the authentication module further, receives a query, upon authentication of the user, for rendering the content to the user; and executes the query on a metadata repository to identify the content for being rendered to the user.

10. A non-transitory computer readable medium having embodied thereon a computer program for executing a method for role-based content rendering, associated with a system, the method comprising:

authenticating a user to access content associated with a metadata driven framework and the metadata is employed for defining a plurality of content objects for at least one application, the content comprising data and content objects related to one or more applications stored in an one or more application data repositories, wherein the authentication is based on login credentials of the user, wherein:

the content objects include a plurality of user interfaces (UIs) and UI elements to render role-based content of the one or more applications from the one or more application data repositories;

each of the plurality of UIs is associated with an application from the one or more applications and defines a workspace for the user;

the UI elements include reports, graphs, and charts;

determining, by a processor, an application role associated with the user, wherein the determination is based on login credentials of the user, and wherein the application role defines an access permission for the user to selectively access information associated with a metadata driven framework, wherein a query is automatically generated, upon authentication of the user, for rendering the content to the user;

identifying, by the processor, one or more of the content objects associated with the determined application role of the user, wherein the identification is based on a mapping of application roles with the content objects, and wherein the identifying the one or more of the content objects further comprises identifying a plurality of parameters associated with the identified content objects, the plurality of parameters referring to a criteria based on which the content objects are rendered to the user, wherein the plurality of UI elements associated with the user are defined based on access permissible to the user;

receiving, by the processor, a custom logic for customizing the content objects, based on the at least one application role, wherein the custom logic is defined by using pre-defined tag libraries; and providing, by the processor, access to the identified content objects based on the defined custom logic; wherein a tag library is indicative of a set of custom tags that invoke custom actions in a file stored in the one or more application data repositories, said application data repositories configured to receive at least one query from a user device and identify the location in the application data repository which the user device is seeking, and wherein the custom logic defines a layout for customizing the identified content objects and the custom logic is written using a plurality of tag libraries pre-defined in the one or more application data repositories;

receiving, by the processor, the custom logic for rendering the identified content objects, based on the at least one application role, wherein the custom logic is defined by using the plurality of pre-defined tag libraries;

rendering, by the processor, the identified content objects accessible to the user based on the defined custom logic and modifying the identified content objects based on users privileges, wherein the custom tag libraries provided by a metadata driven framework enables the user to render data from a plurality of resources by configuring the custom logic to provide a plurality of inputs on a screen;

associating, by the processor, at least one user defined filter on the rendered content, wherein the user defined filter creates a subset of the rendered content and configuring a plurality of rules to define and control data access by users based on at least pre-defined application role wherein the configured plurality of rules secure the identified content objects from unauthorized access;

defining, by the processor a model of the metadata driven framework, wherein at least one of User Interface (UI) and User Interface (UI) elements create a dependency relationship, wherein each UI is mapped with one or more UI elements and wherein the metadata driven framework is configured to support rendering of data in a plurality of formats, by providing a one-line status within the UI to access further information; and reading, by the processor, a plurality of user inputs and resizing the one or more UI elements by reading a gesture of an input device, wherein the input device is at least one of a stylus, a hand gesture or a touch screen.

11. The non-transitory computer readable medium as claimed in claim 10, wherein the method further comprising authenticating, by the processor, the user to access the content stored in an one or more application data repositories.

12. The non-transitory computer readable medium as claimed in claim 10, wherein the identifying the one or more of the content objects further comprises determining filters assigned for the one or more of the content objects based on the at least one application role, wherein the filters are applied to the one or more of the content objects to restrict rendering of data being provided by the one or more of content objects.

13. The non-transitory computer readable medium as claimed in claim 10, wherein the identifying the plurality of parameters comprises assigning a default value to each of the plurality of parameters, the default value being set when the one or more content objects are rendered for a first time.

14. The non-transitory computer readable medium as claimed in claim 10, wherein the content objects include a plurality of user interfaces (UIs) and UI elements to render role-based content of the one or more applications from one or more application data repositories.

15. The non-transitory computer readable medium as claimed in claim 14, wherein each of the UIs is associated with an application from the plurality of applications and defines a workspace for a user and the UI elements include reports, graphs, and charts.

* * * * *